GEORGE B. STACY, OF RICHMOND, VIRGINIA.

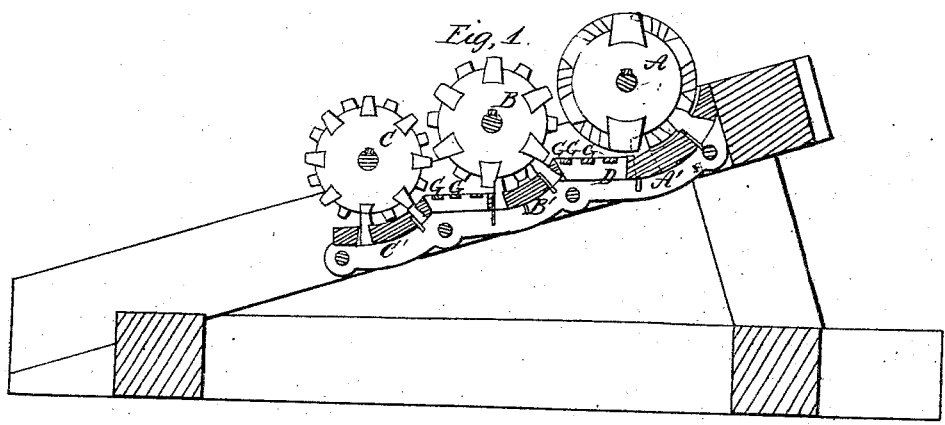
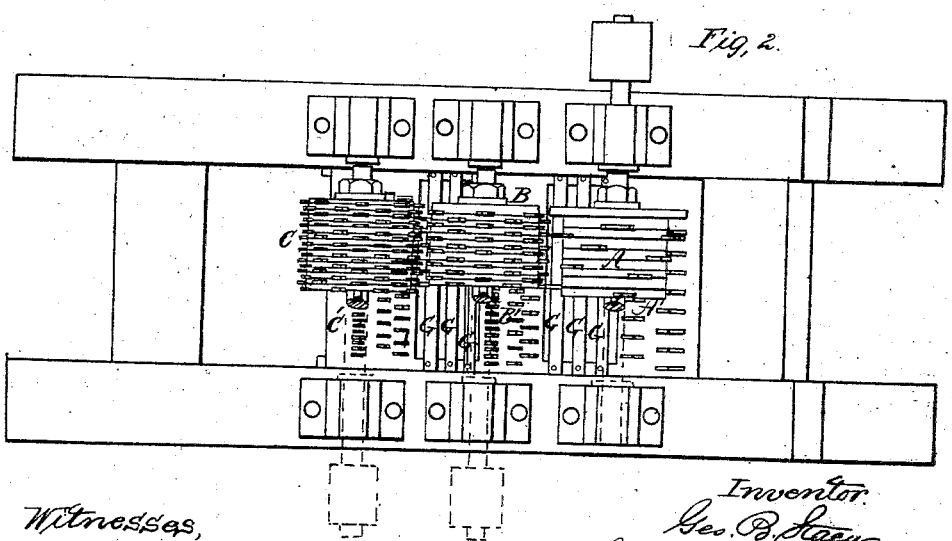

Letters Patent No. 88,092, dated March 23, 1869.

IMPROVEMENT IN MACHINE FOR HACKLING CORN-HUSKS.

The Schedule referred to in these Letters Patent and making part of the same.

*To all whom it may concern:*

Be it known that I, GEORGE B. STACY, of Richmond, Virginia, have invented a new and improved Machine for Hackling Corn-Husks; and I declare that the following is a sufficiently full and exact description thereof to enable one skilled in the art to which my invention appertains, to carry it into effect, reference being had to the accompanying drawings, which are made a part of this specification.

My invention consists in the arrangement of a succession of toothed cylinders, (preferably of different sizes,) and a succession of corresponding toothed concaves, in a frame-work constructed for the purpose, as may hereafter appear.

In the accompanying drawings—

Figure 1 represents a longitudinal section of my machine, in a form which I have found to operate with good effect.

Figure 2 is a plan view of a portion of the same.

Similar letters of reference indicate corresponding parts in the drawings.

A, B, and C, represent cylindrical rollers, of the respective diameters of sixteen, fifteen, and fourteen inches.

These cylinders are arranged upon a frame-work, of any proper construction, provided that the frame-work itself shall have a longitudinal inclination in the direction of the cylinder C; or they may be arranged upon a horizontal frame, in such a manner as to bring the cylinder B lower than A, and C lower than B, for the purposes hereinafter described. I prefer the inclined frame.

The teeth are arranged circumferentially around each cylinder, either spirally or in such a manner as will bring each tooth opposite the space between two others in the concave through which it works. The first cylinder and concave teeth, being two inches in length, are so arranged and accommodated to each other, that the shucks, or husks will be stripped into shreds lengthwise, instead of being chopped, or cut transversely in the process.

The cylinder may be divided into disks, or sections, and, in this case, contain two or more teeth in each disk.

The second cylinder is constructed as the first, containing six teeth in each disk, the teeth being one and one-fourth inch in length.

The third cylinder is made the same as the foregoing, having, however, eight teeth in each disk, the teeth being three-fourths of an inch each in length.

Underneath each cylinder is a corresponding concave, supplied with teeth as follows:

In the first concave there are two rows, extending from side to side, each containing eight teeth, equally distant from each other; but the teeth in these rows alternate with each other, so that one tooth of the first row passes between each alternate circumferential row of the cylinder, and the teeth of the second, or alternate row, pass between those on the cylinder that are not traversed by the first.

The duty of these teeth, in conjunction with the cylinder, is to straighten the shucks, and tear them from their buts, preparatory to their being stripped, shredded, or hackled, by the other cylinders.

The second concave is supplied with two rows of teeth, extending across, from side to side, and alternating with each other, and one row at the lower edge of the concave, containing double the number of teeth contained in each of the two rows just mentioned, the teeth placed equally distant from each other, and in such a manner as to permit the free revolution of the cylinder above it.

The teeth in the third concave are arranged in the same manner as those in the second, and complete the work of tearing the husks, or shucks into shreds, as begun by the latter.

By having the teeth arranged as above described, cutting the husks, or shucks transversely is avoided, and at the same time the tearing them into shreds is fully accomplished.

These concaves are arranged, in reference to each other, so that the highest end of the concave B is lower or not above the level of the lowest end of the concave A, and the highest end of the concave C, lower than the lowest end of the concave B, as shown in the drawings.

The spaces between the concaves A' B' C' are supplied with slats, or bars, G, running parallel with the cylinders, wide enough apart to permit the buts of the husks to pass through between them.

The cylinders all revolve in the same direction, A' at the rate of twelve hundred, B', fourteen hundred, and C' at sixteen hundred revolutions per minute.

The manner of operation is as follows:

The husks, being placed in at the cylinder A, are taken by the teeth into the concave A', and make their appearance at D, where the heavier parts are forced or drop out through the slats, and the husks are taken on into the concave B' by the cylinder B.

This double action is accomplished by the angle of elevation at which the teeth of the cylinder B first strike the matter, as it comes from underneath the cylinder A, the angle being made such, by the inclination of the former beneath the latter, as that the teeth of B strike the buts with sufficient force to throw them off at a tangent, and through the apertures provided by the use of the slats G between the concaves, the husks themselves being carried forward by the revolutionary force of the cylinder, and the collective force of the draught produced by the same, into the concave B'. The same process is repeated at C, by means of similar arrangements of the cylinder, concave, and slats.

While thus describing the construction and arrangement of the various parts of a machine which I have in successful operation, I do not desire to limit myself to the precise details here laid down; but the following is what I claim as new, and desire to secure by Letters Patent:

1. I claim the arrangement of two or more drums, or cylinders, so as to produce the results by their successive action set forth, substantially as herein described.

2. I claim the arrangement of the series of cylinders in an inclined plane, or any other relation that will admit the tangential effect of the stroke of the cylinder-teeth upon the buts of the shucks, as they pass through the machine; substantially as and for the purposes explained.

3. I claim the slats G and their arrangement relatively to the cylinders and concaves, substantially as herein described.

4. I claim the relative size and arrangement of the teeth in both cylinders and concaves, substantially as herein represented and described.

G. B. STACY.

Witnesses:
GEO. P. STACY,
A. N. CLARKE.